(12) United States Patent
Braithwaite et al.

(10) Patent No.: US 8,974,845 B2
(45) Date of Patent: Mar. 10, 2015

(54) SHELLING OF COOKED EGGS

(75) Inventors: David C. Braithwaite, Houston, TX (US); Vasuhi Jian Rasanayagam, Newark, DE (US); Timothy Lawrence Murray, Newark, DE (US)

(73) Assignees: American Air Liquide, Inc., Fremont, CA (US); Air Liquide Industrial U.S. LP, Houston, TX (US)

( * ) Notice: Subject to any disclaimer, the term of this patent is extended or adjusted under 35 U.S.C. 154(b) by 0 days.

(21) Appl. No.: 13/538,110

(22) Filed: Jun. 29, 2012

(65) Prior Publication Data
US 2014/0004236 A1    Jan. 2, 2014

(51) Int. Cl.
*A23L 1/32*    (2006.01)
(52) U.S. Cl.
CPC ................... *A23L 1/3212* (2013.01)
USPC .......................................... 426/299; 426/300
(58) Field of Classification Search
CPC ..... A23L 1/32; A23V 2250/11; A23B 5/0052
USPC .......................... 426/298, 614, 521, 299, 393
See application file for complete search history.

(56) References Cited

U.S. PATENT DOCUMENTS

| | | | |
|---|---|---|---|
| 3,216,828 A | 11/1965 | Koonz et al. | |
| 3,603,243 A | 9/1971 | Foster | |
| 3,684,531 A | 8/1972 | Foster | |
| 5,053,238 A | 10/1991 | Zeidler et al. | |
| 2009/0094995 A1* | 4/2009 | Braithwaite | 62/63 |

OTHER PUBLICATIONS 13538110-468371, EIC—Search, Oct. 28, 2014.*

* cited by examiner

*Primary Examiner* — Humera Sheikh
*Assistant Examiner* — Hong T Yoo
(74) *Attorney, Agent, or Firm* — Christopher J. Cronin

(57) ABSTRACT

An improved process for peeling hard boiled eggs includes contacting the cooked egg with a cold inert gas before peeling.

9 Claims, No Drawings

SHELLING OF COOKED EGGS

CROSS-REFERENCE TO RELATED APPLICATIONS

None.

BACKGROUND

Eggs are an important nutritional product. Whole hard cooked eggs continue to be popular in institutional food service and in retail marketing. Typically in large scale production of hard boiled eggs, uncooked shell eggs are cooked in water to a hard boiled level and then subjected to prompt cooling in a cold water bath for avoiding the formation of gray discoloration on the yolk followed by air cooling. After the cold water bath and air cooling steps, the egg shells are cracked and peeled by any one of a wide variety of egg shell peeling machines known in the art. However, peeling can be difficult to perform without at least some damage to the egg white albumen, without affecting the shape and texture of the hard boiled eggs, or without effecting their taste or appearance.

Despite their usefulness, egg peeling machines still yield a certain degree of non-uniformity of peeling. For example, while the large majority of the eggs are wholly peeled with the albumen fully intact, some eggs may still have portions of shell adhered to the cooked albumen. Still other eggs are missing portions of the albumen or yolk. In either case, the damaged eggs do not have the desired appearance and the potential yield of the egg peeling machine is decreased. One of the reasons this occurs is due to the strong adherence of the shell to the albumen via the membrane that otherwise ordinarily separates the two. Because such machines will inevitably result in a certain number of eggs that are not considered desirable for sale as whole cooked eggs, the desirable eggs need to be sorted by an operator from the undesirable eggs. The manual sorting can bottleneck the entire process and adds to the processing cost per egg. As the peeled eggs with an undesirable appearance are not suitable for retail sale as whole cooked eggs, they are typically set aside for less valuable uses such as chopped egg for salads.

Some have proposed that the problem of overly strong adherence of membrane to albumen is exacerbated in freshly laid eggs versus aged eggs. Thus, instead of allowing the eggs to age before boiling and shelling, some, such as U.S. Pat. Nos. 3,216,828 and 5,053,238, have proposed to artificially age the eggs by hastening the loss of $CO_2$ or dissolving or softening the shell by a chemical treatment. However, such chemical treatments can potentially alter the flavor, odor, and coloration of hard boiled eggs. Moreover, many consumers desiring more wholesome foods are put off by chemical treatment of foodstuffs.

Others, such as U.S. Pat. Nos. 3,603,243 and 3,684,531, have proposed freezing a portion of the egg after boiling followed by cracking of the shell while the portion is still frozen. However, the freezing of a hard boiled egg can cause them to become tough and watery. Additionally, contrary to the teachings in these patents, we have found that it is actually more difficult to peel an egg whose outer portion has been frozen since the egg shell adheres too tightly to the albumen. As a result, peeling results in removal of some of the egg white.

Thus, there is a need to improve the yield and throughput of egg peeling machines and lower the overall processing cost without sacrificing appearance, flavor or odor, or requiring the use of a chemical treatment.

SUMMARY

There is provided an improved process for peeling cooked unshelled eggs, comprising the following steps. Unshelled eggs are boiled. The unshelled eggs are cooled in a cold water bath. The cooled, unshelled eggs are contacted with a cold inert gas having a temperature of about −70 to about −100 ° F. The shells are peeled from the unshelled eggs with an egg shell peeling machine after the unshelled eggs are cooled in the cold water bath.

The method may include one or more of the following aspects:
- the unshelled eggs maintaining at room temperature for at least one minute after the unshelled eggs have been contacted with the cold, inert gas.
- the cold, inert gas is food grade nitrogen.
- the cold, inert gas is food grade carbon dioxide.
- the eggs are contacted with the cold, inert gas inside a convective freezing tunnel.
- the eggs are contacted with the cold, inert gas inside a convective freezing tunnel.
- the cold, inert gas is food grade nitrogen.
- the cold, inert gas is food grade carbon dioxide.
- the eggs are contacted with the cold, inert gas inside a convective freezing tunnel.

DETAILED DESCRIPTION

The uncooked shell eggs are first boiled, typically in water. The conditions under which eggs are cooked to a hard cooked stage are well known in the art and need not be repeated herein. The hard boiled eggs are then chilled in a cold water bath. Typically, the eggs are cooled to a temperature of at least 40° F. and no greater than 60° F.

After the cold water bath chilling step, according to the invention the eggs are contacted with a cold inert gas having a temperature of between −70 and −100° F. under conditions to rapidly chill the egg shell but which does not result in freezing of any portion of the eggs. Typically, the temperature of the eggs is not decreased below 40° F. Typically, the eggs are contacted with the cold inert gas for about 45-75 seconds. The cold inert gas may be nitrogen, carbon dioxide, argon, or mixtures of the foregoing. The contact between the eggs and the cold inert gas may be performed in a freezer, typically a convection freezer so long as there is no contact between the eggs and the liquid nitrogen, solid carbon dioxide, or liquid argon. Rather, the eggs are only contacted by cold gas. One suitable type of convection freezer is a freezing tunnel. Preferably, the freezing tunnel is an ALIGAL™ FZ freezer available from Air Liquide.

After the cold inert gas treatment, the eggs are peeled in an egg shell peeling machine. Optionally, the eggs may be allowed to equilibrate at ambient temperature conditions before being peeled. Any one of several different types of commercially available egg peeling machines may be used. Their details are well known and need not be repeated herein.
Experimental Comparison Eggs were placed in boiling water for 12 minutes. A thermocouple was attached to the shell of one of the eggs while another was inserted a couple of mm below the surface of the shell. The boiled eggs were then placed in cool water and placed in a refrigerator set to 52° F. until the surface and interior egg temperatures reached to about 50° F.

The cooled eggs were divided into 3 groups:

a) Control I—eggs that were peeled with no further chilling;

b) Example I—eggs that were cryogenically chilled in an ALIGAL™ FZ tunnel freezer (generating cold inert gas through vaporization of liquid nitrogen sprayed into the freezer interior) and peeled immediately; and c) Example II—eggs that were cryogenically chilled in the ALIGAL™ FZ tunnel freezer (generating cold inert gas through vaporization of liquid nitrogen sprayed into the freezer interior) and then peeled after a 5 minute lag time.

For Examples I and II, the ALIGAL™ FZ tunnel freezer was set to an interior temperature of −80° F. with a residence time of about 1 minute. In Example II, the temperatures of the eggs (in two runs: Run 1 and Run 2) were measured just before entering the freezer, just after coming out of the freezer, and at 30 second increments thereafter up to 5 minutes. The temperatures are listed in Table I. Because no commercial egg peeling machine was available, each of the Control eggs, Example I eggs, and Example II eggs were then manually peeled.

TABLE I

Surface Temperature Of Eggs After Exit From Tunnel

| Time (sec) | Temperature (° F.) Run 1 | Temperature (° F.) Run 2 |
| --- | --- | --- |
| 0 | 51.6 | 46.9 |
| 30 | 53.8 | 52.7 |
| 60 | 54.1 | 52.9 |
| 90 | 54.1 | 53.6 |
| 120 | 53.9 | 53.5 |
| 150 | 53.7 | 53.5 |
| 180 | 53.6 | 56.1 |
| 210 | 54.1 | 55.3 |
| 240 | 53.9 | 55.2 |
| 270 | 53.8 | 55.5 |
| 300 | 54.1 | 56.2 |

Two of the 6 Control eggs were peeled with damage (egg white came out with peel), while four of the 6 Control eggs were deemed satisfactory.

Each of the Example I eggs was peeled without any damage, but in comparison to Example II, peeling was little harder to start due to chilled exterior. It should be noted that none of the Example I eggs were frozen. On the other hand, not only were each of the Example II eggs peeled without any damage, they were easier to peel than the Example I eggs.

Five additional sets of eggs (Control II and Examples III, IV, V, and VI) were treated in the ALIGAL™ FZ tunnel freezer (utilizing cold inert gas generated by vaporization of liquid nitrogen sprayed within the freezer interior). The eggs had a residence time of 45-75 seconds within the freezer. The freezer was set to −90° F. After treatment with the cold inert gas, we found that the eggs were easier to peel in comparison to Control II.

Two additional set of eggs (Control III and Example VII) were treated at a commercial egg processor site. The eggs were boiled and cooled in a cold water bath as described above, but instead of being subjected to the conventional air cooling step, they were contacted with a cold inert gas in batch freezer. Inside the batch freezer, liquid nitrogen was sprayed and the cold nitrogen gas directed across the eggs with a fans. The cold, inert gas treatment was followed by mechanical peeling of the eggs in an egg peeling machine. We found that, in comparison to the food processor's conventional process, the improved process reduced the food processor's yield loss by 15-20%.

The advantages of the invention are numerous:

The cold, inert gas treatment step can be implemented with a chilling device that takes up very little space and can be incorporated into an egg processor's existing conveyor system.

The actual heat removal is minimal (10-20 btus per pound), so the treatment adds very little processing cost in comparison to the reduction in processing cost that is realized by reducing the yield loss.

The downstream manual labor that is ordinarily required for sorting of the usable eggs from the rejected eggs can be reduced or eliminated, thereby lowering the overall processing cost.

The modest percentage increase of refrigeration imparted to the egg by the cold, inert gas also allows for a proportional increase in thoughput.

Because there is additional cooling of the eggs by the cold gas, more eggs may be cooled in the bath even though such additional cooling will not result in a same temperature as compared to when fewer eggs are cooled. As a result, the production capacity may be increased because the cooling bath does not bottleneck the overall process.

Preferred processes and apparatus for practicing the present invention have been described. It will be understood and readily apparent to the skilled artisan that many changes and modifications may be made to the above-described embodiments without departing from the spirit and the scope of the present invention. The foregoing is illustrative only and that other embodiments of the integrated processes and apparatus may be employed without departing from the true scope of the invention defined in the following claims.

What is claimed is:

1. An improved process for peeling cooked unshelled eggs, comprising the steps of:
    boiling eggs having shells;
    cooling the boiled eggs in a water bath;
    after the eggs are cooled in the water bath, contacting the cooled eggs with a cold inert gas having a temperature of about −70 to about −100° F., wherein said contact does not result in freezing any portion of the eggs; and
    peeling the shells from the eggs with an egg shell peeling machine after the eggs are contacted with the cold inert gas.

2. The process of claim 1, further comprising the step of:
    maintaining the unshelled eggs at room temperature for at least one minute after the unshelled eggs have been contacted with the cold, inert gas.

3. The process of claim 2, wherein the cold, inert gas is food grade nitrogen.

4. The process of claim 3, wherein the eggs are contacted with the cold, inert gas inside a convective freezing tunnel.

5. The process of claim 2, wherein the cold, inert gas is food grade carbon dioxide.

6. The process of claim 5, wherein the eggs are contacted with the cold, inert gas inside a convective freezing tunnel.

7. The process of claim 1, wherein the cold, inert gas is food grade nitrogen.

8. The process of claim 1, wherein the cold, inert gas is food grade carbon dioxide.

9. The process of claim 1, wherein the eggs are contacted with the cold, inert gas inside a convective freezing tunnel.

* * * * *